US011591969B2

(12) United States Patent
Garabello et al.

(10) Patent No.: US 11,591,969 B2
(45) Date of Patent: *Feb. 28, 2023

(54) METHOD AND SYSTEM OF CONNECTING A TURBINE ENGINE GEARBOX TO ENGINE CORE

(71) Applicant: GE Avio S.r.l., Rivalta di Torino (IT)

(72) Inventors: Marco Garabello, Turin (IT); Paolo Altamura, Monopoli (IT); Gian Mario Bragallini, Turin (IT); Alessio Gargioli, Rivalta di Torino (IT); Jan Biskupski, Warsaw (PL)

(73) Assignee: GE AVIO S.R.L., Rivalta di Torino (IT)

( * ) Notice: Subject to any disclaimer, the term of this patent is extended or adjusted under 35 U.S.C. 154(b) by 631 days.

This patent is subject to a terminal disclaimer.

(21) Appl. No.: 16/482,086

(22) PCT Filed: Jan. 24, 2018

(86) PCT No.: PCT/EP2018/051738
§ 371 (c)(1),
(2) Date: Jul. 30, 2019

(87) PCT Pub. No.: WO2018/138155
PCT Pub. Date: Aug. 2, 2018

(65) Prior Publication Data
US 2020/0248630 A1   Aug. 6, 2020

(30) Foreign Application Priority Data

Jan. 30, 2017   (EP) .................................... 17425008

(51) Int. Cl.
*F02C 7/36*        (2006.01)
*F16C 1/02*       (2006.01)
(Continued)

(52) U.S. Cl.
CPC ................ *F02C 7/36* (2013.01); *F02C 9/00* (2013.01); *F16C 1/02* (2013.01); *F16D 3/06* (2013.01);
(Continued)

(58) Field of Classification Search
CPC ...... F02C 7/36; F02C 9/00; F16C 1/02; F16C 2360/23; F16D 3/06; F16H 1/28;
(Continued)

(56) References Cited

U.S. PATENT DOCUMENTS 3,844,168 A * 10/1974 Tenkman ................ G01L 3/104
73/862.329
4,557,666 A    12/1985 Baskin et al.
(Continued)

FOREIGN PATENT DOCUMENTS

| CN | 102341588 A | 2/2012 |
| CN | 105673825 A | 6/2016 |
| EP | 3106653 A1 | 12/2016 |

OTHER PUBLICATIONS

European Search Report Corresponding to Application No. 17425008 dated Jul. 7, 2017.

*Primary Examiner* — J. Todd Newton
(74) *Attorney, Agent, or Firm* — Venable LLP; Michele V. Frank

(57) ABSTRACT

The present disclosure is directed to a turbine engine (10) defining an axial direction and a radial direction. The turbine engine includes a fan or propeller assembly (14) comprising a gearbox; an engine core (20) comprising one or more rotors, wherein at least one of the rotors defines an axially extended annular hub; and a flexible coupling shaft (100) defining a first end and a second end along the axial direction, wherein the first end is connected to the engine core and the second end is connected to the gearbox, and further wherein the flexible coupling shaft extends from the (Continued)

one or more rotors to the gearbox in the axial direction and inward of the hub in the radial direction.

20 Claims, 5 Drawing Sheets

(51) Int. Cl.
*F16D 3/06* (2006.01)
*F02C 9/00* (2006.01)
*F16H 1/28* (2006.01)
*F16H 57/00* (2012.01)

(52) U.S. Cl.
CPC ............ *F16H 1/28* (2013.01); *F16H 57/0025* (2013.01); *F05D 2220/32* (2013.01); *F05D 2230/60* (2013.01); *F05D 2240/62* (2013.01); *F05D 2270/07* (2013.01); *F16C 2360/23* (2013.01)

(58) Field of Classification Search
CPC ............ F16H 57/0025; F05D 2220/32; F05D 2230/60; F05D 2240/62; F05D 2270/07; F05D 2220/324; F05D 2220/325; F05D 2220/326; F05D 2220/327; F05D 2260/40311; F05D 2260/96; F01D 5/026
USPC .......................................................... 415/118
See application file for complete search history.

(56) References Cited

U.S. PATENT DOCUMENTS

| | | |
|---|---|---|
| 4,590,820 A | 5/1986 | Hambric |
| 4,622,818 A | 11/1986 | Flaxington et al. |
| 4,932,928 A | 6/1990 | Crockett |
| 6,612,195 B2 | 9/2003 | Gmirya et al. |
| 8,137,081 B2 | 3/2012 | Gausmann et al. |
| 8,159,081 B2 | 4/2012 | Gainford et al. |
| 8,198,749 B2 | 6/2012 | Numajiri |
| 8,572,943 B1 | 11/2013 | Sheridan |
| 8,585,538 B2 | 11/2013 | Sheridan et al. |
| 8,585,539 B2 | 11/2013 | Sheridan et al. |
| 8,747,277 B2 | 6/2014 | Ai et al. |
| 8,974,344 B2 | 3/2015 | McCune et al. |
| 2010/0150702 A1* | 6/2010 | Sheridan ................. F01D 25/18 464/182 |
| 2012/0099988 A1* | 4/2012 | Charier ................... F01D 5/026 416/129 |
| 2012/0260623 A1 | 10/2012 | McCune et al. |
| 2014/0216053 A1 | 8/2014 | McCune et al. |
| 2015/0267618 A1 | 9/2015 | Schwarz et al. |
| 2016/0090988 A1* | 3/2016 | Venter ................... F04D 29/325 416/171 |
| 2016/0123180 A1 | 5/2016 | Otto |
| 2016/0222814 A1 | 8/2016 | Sheridan |
| 2016/0222888 A1 | 8/2016 | Sheridan |
| 2016/0281528 A1* | 9/2016 | Penda ..................... F01D 17/04 |
| 2016/0298485 A1* | 10/2016 | Sheridan ................ F01D 17/06 |
| 2019/0383331 A1* | 12/2019 | Garabello ............... F01D 5/026 |

* cited by examiner

METHOD AND SYSTEM OF CONNECTING A TURBINE ENGINE GEARBOX TO ENGINE CORE

GOVERNMENT SPONSORED RESEARCH

The project leading to this application has received funding from the Clean Sky 2 Joint Undertaking under the European Union's Horizon 2020 research and innovation program under grant agreement No. CS2-ENG-GAM-2014-2015-01.

FIELD

The present subject matter is generally related to turbine engines. More specifically, the subject matter is related to fan or propeller gearbox assemblies of turbine engines.

BACKGROUND

Turbine engines are continually challenged to increase efficiencies related to performance, fuel consumption, and noise output while generally maintaining or decreasing turbine engine packaging (e.g. axial or radial dimensions). One known solution for increasing turbine engine efficiency is introducing a reduction or power gearbox between an engine core and a fan or propeller, such as some in turboprop, turboshaft, and turbofan turbine engine configurations.

However, the gearbox between the engine core and fan or propeller may increase turbine engine packaging. The engine core may also release intermittent changes in torque or power output to the fan or propeller that may induce deformations that may result in failure. Additionally, known turbine engine configurations may create torque paths that reduce system and/or operator response time to overspeed conditions.

Therefore, a need exists for a turbine engine and method of gearbox and engine core arrangement that improves responses to deformations due to intermittent changes in torque or power output, improves torque paths, and/or reduces turbine engine packaging.

BRIEF DESCRIPTION

Aspects and advantages of the invention will be set forth in part in the following description, or may be obvious from the description, or may be learned through practice of the invention.

The present disclosure is directed to a turbine engine defining an axial direction and a radial direction. The turbine engine includes a fan or propeller assembly comprising a gearbox; an engine core comprising one or more rotors, wherein at least one of the rotors defines an axially extended annular hub; and a flexible coupling shaft defining a first end and a second end along the axial direction, wherein the first end is connected to the engine core and the second end is connected to the gearbox, and further wherein the flexible coupling shaft extends from the one or more rotors to the gearbox in the axial direction and inward of the hub in the radial direction.

In one example, the flexible coupling shaft is connected to at least one rotor of the engine core.

In various examples, the flexible coupling shaft defines a plurality of splines, and the gearbox defines a spline interface, and further wherein the plurality of splines is coupled to a spline interface.

In yet another example, the flexible coupling shaft further defines a coupling extended at least partially in the radial direction and coupled to the one or more rotors of the engine core. In one example, the coupling defines one or more fastening locations at which the one or more rotors of the engine core and the coupling attach in axially adjacent arrangement. In another example, the coupling of the flexible coupling shaft is attached to the rotor of the engine core in axially adjacent arrangement, and wherein the rotor defines a rotor in the compressor section. In yet another example, the coupling of the flexible coupling shaft is attached to the rotor of the engine core in axially adjacent arrangement, and wherein the rotor defines a rotor in the turbine section.

In various examples, the turbine engine further includes one or more speed sensors disposed in the radial direction toward the hub of the rotor, in which the one or more speed sensors is disposed between the first end and the second end of the flexible coupling shaft.

In various examples, the plurality of splines of the flexible coupling shaft defines a star gear, and wherein the star gear is coupled to the spline interface at the gearbox.

In still various examples, the flexible coupling shaft defines a second plurality of splines at the first end, and wherein the second plurality of splines couples with a second spline interface at the engine core.

In one example, the turbine engine further includes one or more torque sensors disposed at the second end of the flexible coupling shaft, in which the one or more torque sensors is disposed in the radial direction toward the flexible coupling shaft.

In still another example, the turbine engine further includes one or more bearings coupled to the hub of the rotor from which the flexible coupling shaft extends toward the gearbox. In one example, the one or more bearings is disposed between the first end and the second end of the flexible coupling shaft. In various examples, the turbine engine further includes one or more speed sensors disposed in the radial direction toward the hub of the rotor, in which the one or more speed sensors is disposed between the first end and the second end of the flexible coupling shaft, and further wherein the one or more speed sensors is disposed between the one or more bearings and the first end of the flexible coupling shaft.

Another aspect of the present disclosure is directed to a method of arranging a turbine engine. The turbine engine includes a fan or propeller assembly and an engine core, and the fan or propeller assembly includes a gearbox defining a spline interface. The engine core includes one or more rotors, one or more of the rotors defining a hub extended in an axial direction. The method includes connecting a first end of a flexible coupling shaft to the rotor; extending the flexible coupling shaft in the axial direction and radially within the hub of the rotor; and connecting a second end of the flexible coupling shaft to the gearbox of the fan or propeller assembly.

In one example of the method, connecting a first end of a flexible coupling shaft to the rotor includes connecting a radially extended portion of the first end of the flexible coupling shaft in adjacent axial arrangement to a radially extended portion of the rotor.

In another example, the method includes positioning one or more speed sensors proximate to the hub of the rotor. In one example, positioning one or more speed sensors proximate to the hub of the rotor includes positioning one or more speed sensors between the first end and the second end of the flexible coupling shaft.

In yet another example, the method includes positioning one or more torque sensors proximate to the second end of the flexible coupling shaft.

In various examples, the method further includes positioning one or more bearings to the hub of the rotor from which the flexible coupling shaft extends toward the gearbox.

These and other features, aspects and advantages of the present invention will become better understood with reference to the following description and appended claims. The accompanying drawings, which are incorporated in and constitute a part of this specification, illustrate aspects of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
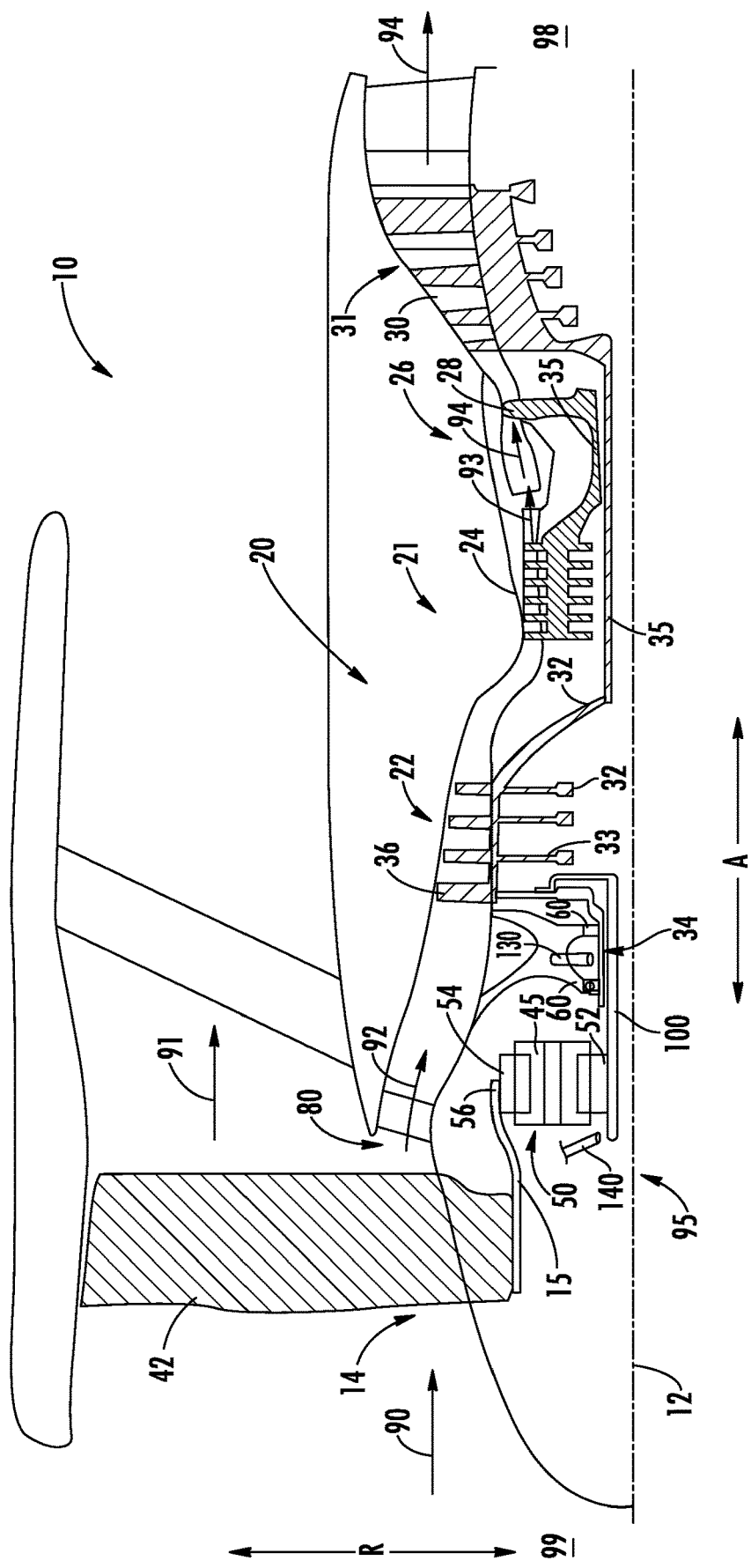
FIG. 1 is a schematic cross sectional view of an exemplary embodiment of a system of connecting a gearbox to engine core according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Systems and methods of connecting a turbine engine gearbox and engine core are generally provided. The systems and methods generally disclosed herein may improve responses to deformations due to intermittent changes in torque or power output, improve system and/or operator response to overspeed conditions and/or improve engine packaging. The system includes a flexible coupling shaft connecting a reduction or power gearbox of a fan or propeller assembly to an engine core. The flexible coupling shaft generally includes a fastening arrangement to a rotor of the engine core and a splined arrangement coupled to the gearbox. The flexible coupling shaft generally provides for axial and radial deformation of the shaft while maintaining connection to and necessary movement of the engine core and the gearbox.

Additionally, methods of arranging a turbine engine and connecting a gearbox and engine core include separating the torque path from the engine core speed sensing path. The methods may further include separating a torque sensing path from the engine core speed sensing path. Methods of connecting a turbine engine include connecting a first end of a flexible coupling shaft to the gearbox, extending the shaft within a hub of a rotor of the engine core, and connecting a second end of the shaft to the rotor.

Figure 2:
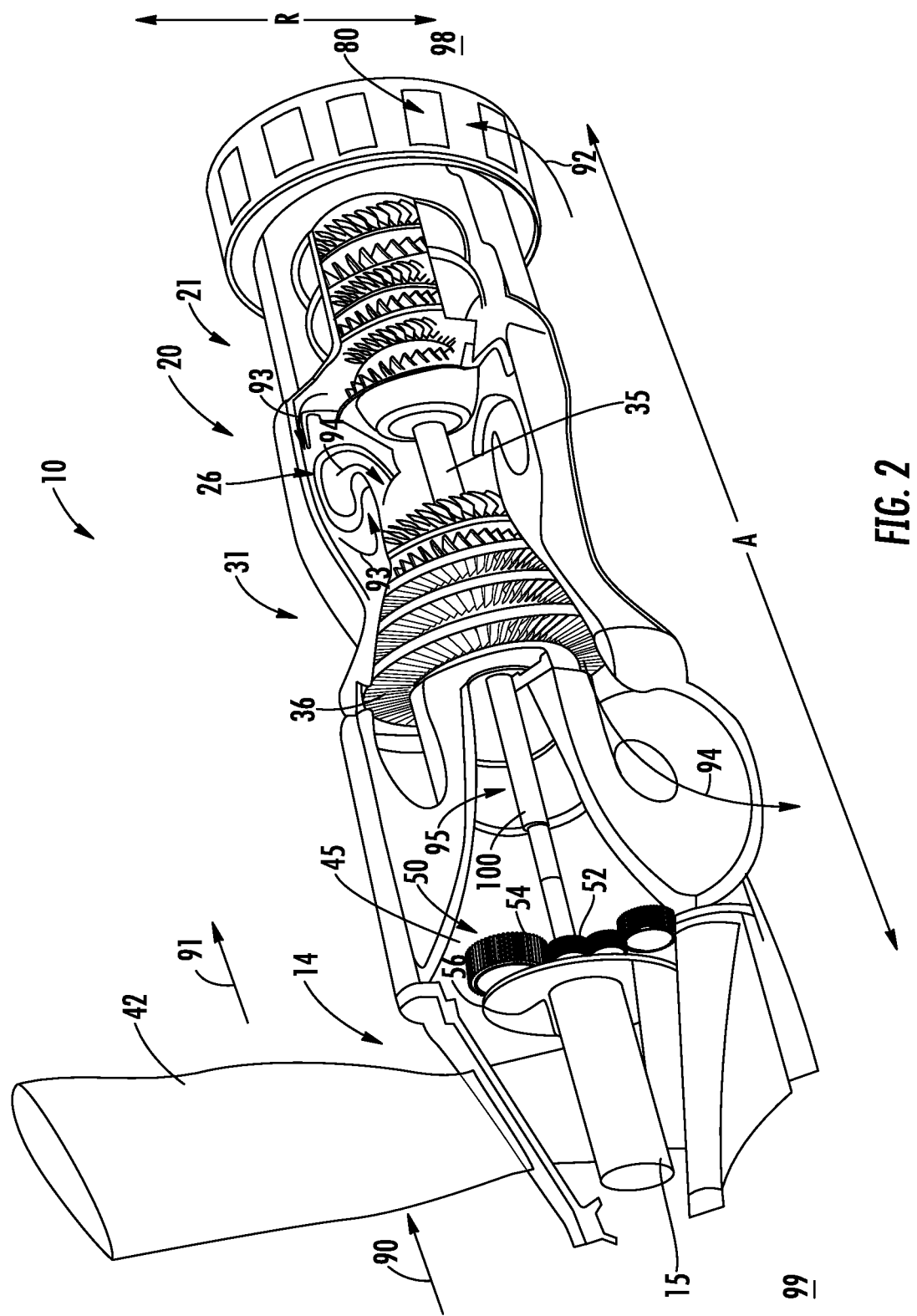
FIG. 2 is a schematic cross sectional view of another exemplary embodiment of a system of connecting a gearbox to engine core according to an aspect of the present disclosure.

Referring now to the drawings, FIGS. 1 and 2 are each schematic cross sectional views of an exemplary gas turbine engine 10 (herein referred to as "engine 10"). In FIG. 1, the engine 10 is shown as a high bypass turbofan engine, incorporating an exemplary embodiment of a flexible coupling shaft 100 according to an aspect of the present disclosure. In FIG. 2, the engine 10 is shown as a turboprop engine incorporating an exemplary embodiment of the flexible coupling shaft 100 according to an aspect of the present disclosure. Although further described below with reference to a turbofan engine and/or a turboprop engine, the present disclosure is also applicable to wind turbines and turbomachinery in general, including propfan, turbojet, and turboshaft gas turbine engines, including marine and industrial turbine engines and auxiliary power units. As shown in FIGS. 1 and 2, the engine 10 has an axial centerline axis 12 that extends there through for reference purposes. The engine 10 defines an axial direction A, a radial direction R, and a forward end 99 and an aft end 98 along the axial direction A.

In general, the engine 10 may include an engine core 20 and a fan or propeller assembly 14. The engine core 20 may generally include, in serial flow arrangement, a compressor section 21, a combustion section 26, and a turbine section 31. The compressor section 21 may define one or more compressors, such as a high pressure compressor (HPC) 24 and a low pressure compressor (LPC) 22. The turbine section 31 may define one or more turbines, such as a high pressure turbine (HPT) 28 and a low pressure turbine (LPT) 30. In various embodiments, the compressor section 21 may further include an intermediate pressure compressor (IPC). In still other embodiments, the turbine section 31 may further include an intermediate pressure turbine (IPT). In wind turbine applications, the engine core 20 may generally be defined as one or more generators.

Each of the compressors 22, 24 in the compressor section 21 and each of the turbines 28, 30 in the turbine section 31 may include one or more rotors 32. In one embodiment, the rotors 32 include one or more shafts 35 of the engine 10 connecting the compressor section 21 to the turbine section 31. In other embodiments, the rotors 32 generally define a disk 33 extended at least partially in the radial direction R and a plurality of airfoils 36 connected in circumferentially adjacent arrangement and extended outward in the radial direction R from the disk 33. In one embodiment, the one or more rotors 32 may each be connected together. For example, each rotor 32 of the turbine section 31 or the compressor section 21 may be connected by mechanical fasteners, such as bolts, nuts, screws, or rivets, or by a bonding process, such as welding, friction bonding, diffusion bonding, etc. In various embodiments, one or more compressors of the compressor section 21 may be drivingly connected and rotatable with one or more turbines of the turbine section 31 by way of the one or more shafts 35.

The fan or propeller assembly 14 generally includes a fan rotor 15. The fan rotor 15 includes a plurality of fan or propeller blades 42 that are coupled to and extend outwardly from the fan rotor 15 in the radial direction R. In the embodiments shown in FIGS. 1 and 2, the fan rotor 15 may extend in the axial direction A toward the forward end 99 from a reduction or power gearbox 45. The fan or propeller assembly 14 further includes the flexible coupling shaft 100 coupled to the gearbox 45 and extended toward the aft end 98 and coupled to the engine core 20.

In one embodiment, the gearbox 45 may include an epicyclical gear train 50 including a star gear 52 and a plurality of planet gears 54. The plurality of planet gears 54 may each be fixed such that each planet gear 54 rotates on a fixed axis relative to the star gear 52. An annular gear 56 surrounds the plurality of planet gears 54 and rotates and transfers power and torque from the star gear 52 through the plurality of planet gears 54. In the embodiments shown herein, the annular gear 56 may be coupled to or otherwise integral with the fan rotor 15. In one embodiment, the star gear 52 may be attached to, or integral to, the flexible coupling shaft 100. In various embodiments, the gearbox 45 may further include additional planet gears disposed radially between the plurality of planet gears 54 and the star gear 52, or between the plurality of planet gears 54 and the annular gear 56.

Referring back to FIGS. 1 and 2, the flexible coupling shaft 100 is connected to the engine core 20 to transmit torque and power through the star gear 52 to the gearbox 45 to the fan rotor 15. The fan rotor 15 may be connected to the surrounding annular gear 56 or the planet gears 54 to receive torque from the star gear 52 and transfer torque to drive the fan or propeller assembly 14. As power and torque are transmitted from the engine core 20, the gearbox 45 provides power and torque at an output speed to the fan rotor 15 more suitably adjusted for the fan or propeller assembly 14. For example, the gearbox 45 may reduce fan rotor 15 speed relative to the engine core 20 by a factor of two or more.

Figure 3:
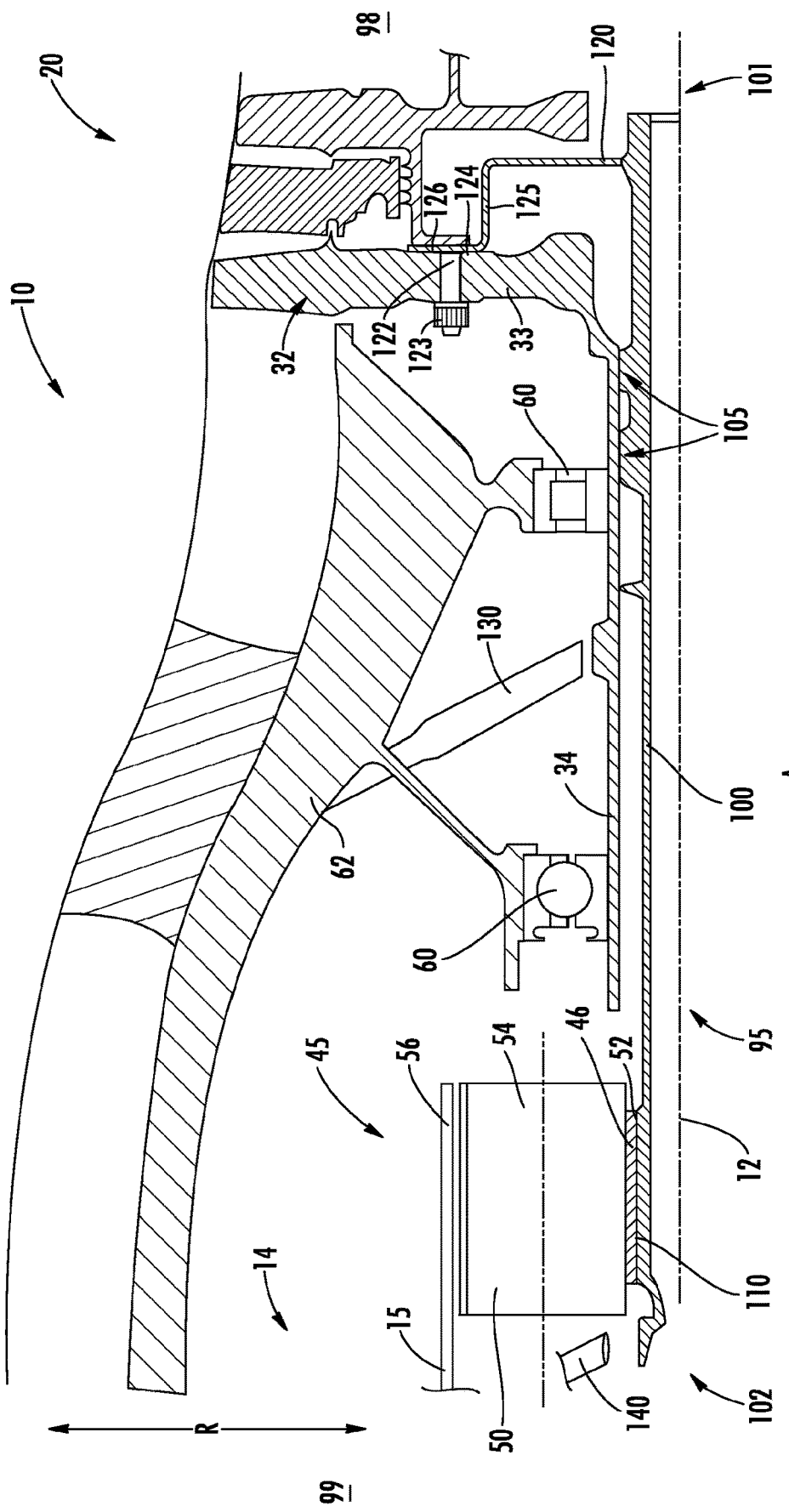
FIG. 3 is a schematic cross sectional view of an exemplary embodiment of a flexible coupling shaft connecting an exemplary gearbox and engine core.
Figure 4:
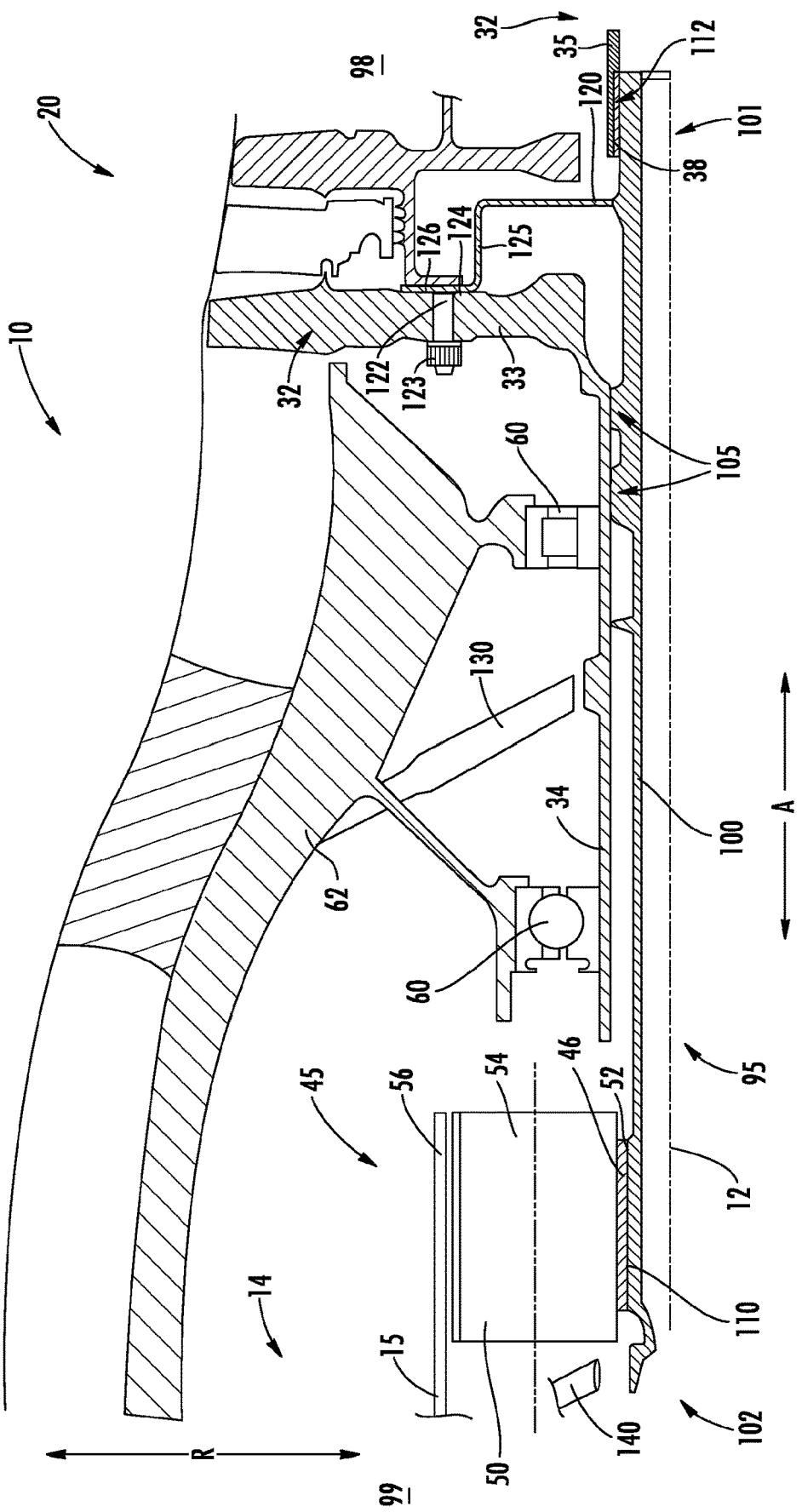
FIG. 4 is a schematic cross sectional view of another exemplary embodiment of a flexible coupling shaft connecting an exemplary gearbox and engine core.

Referring now to FIGS. 3 and 4, exemplary embodiments of a portion of a turbine engine 10 including the flexible coupling shaft 100 connecting the gearbox 45 and the engine core 20 are provided. The flexible coupling shaft 100 defines a first end 101 and a second end 102 along the axial direction A, in which the first end 101 is proximate to the engine core 20 and the second end 102 is proximate to the gearbox 45. The flexible coupling shaft 100 is connected at the first end 101 to the engine core 20 and at the second end 102 to the gearbox 45.

The flexible coupling shaft 100 defines a plurality of splines 110 at the second end 102, in which the plurality of splines 110 of the flexible coupling shaft 100 are coupled, mated, or meshed to a spline interface 46 at the gearbox 45. In various embodiments, the plurality of splines 110 is coupled to the gearbox 45. In one embodiment, the plurality of splines 110 defines the star gear 52 of the gearbox 45. The plurality of splines 110 may define a plurality of radially outward extended splines configured to mesh or interface with the spline interface 46 of the plurality of planet gears 54. In another embodiment, the plurality of splines 110 of the flexible coupling shaft 100 may mesh or interface with the spline interface 46 of the gearbox 45, in which the spline interface 46, as the star gear 52 of the gearbox 45, defines a plurality of radially inward extended splines.

Referring now to FIG. 4, in one embodiment of the flexible coupling shaft 100 and the engine 10, the flexible coupling shaft 100 defines a second plurality of splines 112 at the first end 101. The second plurality of splines 112 at the first end 101 of the flexible coupling shaft 100 may couple, mesh, or interface with a second spline interface 38 at the engine core 20. In one embodiment, the second spline interface 38 is defined at the rotor 32 of the engine core 20. In another embodiment, the second spline interface 38 is defined at the shaft 35 of the engine 10. In various embodiments, the second plurality of splines 112 of the flexible coupling shaft 100 defines a plurality of radially outward extended splines configured to mesh or interface with a plurality of radially inward extended splines of the second spline interface 38.

Referring back to FIGS. 3 and 4, the flexible coupling shaft 100 may further define a coupling 120 extended at least partially in the radial direction R coupled to the engine core 20. In one embodiment, the coupling 120 defines one or more fastening locations 124 at which the one or more rotors 32 of the engine core 20 and the coupling 120 attach in axially adjacent arrangement. In another embodiment, the coupling 120 defines a plurality of orifices 122 through which one or more fasteners 123 may extend into the rotor 32 of the engine core 20. The plurality of orifices 122 may extend generally in the axial direction A through the coupling 120 and the rotor 32. In various embodiments, the one or more fasteners 123 or fastening locations 124 may include mechanical fasteners, such as, but not limited to, bolts, nuts, screws, and/or rivets, and/or fastening or joining processes, such as welding or bonding processes, including, but not limited to, friction welding or diffusion bonding, or combinations thereof.

The radially extended coupling 120 may further extend at least partially in a circumferential direction. In one embodiment, the coupling 120 is annular and defines a plurality of fastening locations 124 or orifices 122 in circumferential arrangement around the annulus. In another embodiment, the coupling 120 extends radially at a plurality of disjoined circumferential locations, in which each disjoined circumferential location may define a fastening location 124 or orifice 122.

The radially extended coupling 120 may further define an axial portion 125 extended toward the rotor 32 and a radial portion 126 axially adjacent to the rotor 32. The coupling 120, including the axial portion 125 and/or the radial portion 126, may together define springing properties that allow an appropriate amount of flexibility from the engine core 20 to the gearbox 45 such that the plurality of splines 110 or the star gear 52 may move in the radial direction R and/or axial direction A. Movement of the plurality of splines 110 or the star gear 52 due to changes in loads from the engine core 20 may provide equalization of loads among the planet gears 54 in the gearbox 45. Additionally, or alternatively, intermittent changes, fluctuations, or deformations in, or caused by, the engine core 20 may be compensated by the flexible coupling shaft 100 and resist transfer to the gearbox 45 or the fan or propeller assembly 14.

Referring still to FIGS. 3 and 4, the rotor 32 to which the flexible coupling shaft 100 is connected may include one or more rotors 32 of the turbine section 31 or the compressor section 21. Referring to FIGS. 3 and 4 and the engine 10 in a turbofan configuration as shown in FIG. 1, the flexible coupling shaft 100 may be connected to rotor 32 in the compressor section 21. For example, in the embodiment shown in FIG. 1, the flexible coupling shaft 100 extends from the gearbox 45 to the LPC 22, or, in other embodiments, the IPC. In another embodiment of the flexible coupling shaft 100 as shown in FIGS. 3 and 4 and in the engine 10 as a turboprop configuration as shown in FIG. 2, the flexible coupling shaft 100 may be connected to the rotor 32 in the turbine section 31. For example, in the embodiment shown in FIG. 2, the flexible coupling shaft 100 extends from the gearbox 45 to the LPT 30.

In various embodiments, the rotor 32 may define an annular hub 34 extended in the axial direction A from the disk 33 of the rotor 32. The hub 34 of the rotor 32 may extend generally in the axial direction A toward the gearbox 45. In one embodiment, the engine 10 further includes one or more bearings 60 coupled to the hub 34 of the rotor 32. In one embodiment, as shown in FIGS. 3 and 4, the one or more bearings 60 is coupled to the hub 34 of the rotor 32 from which the flexible coupling shaft 100 extends toward the gearbox 45. The one or more bearings 60 may be disposed between the first end 101 and the second end 102 of the flexible coupling shaft 100. The bearing 60 may further be coupled to one or more static frame(s) 62 configured to dispose the one or more rotors 32 co-axially to the axial centerline 12.

Referring still to FIGS. 3 and 4, the flexible coupling shaft 100 may extend from the rotor 32 to the gearbox 45 in the axial direction A and inward of the hub 34 in the radial direction R. The engine 10 may further include a speed sensor 130 disposed between the first end 101 and the second end 102 of the flexible coupling shaft 100. The speed sensor 130 may be disposed in the radial direction R toward the hub 34 of the rotor 32. In various embodiments, the speed sensor 130 extends through the static frame 62 in the radial direction R toward the hub 34 of the rotor 32. In one embodiment, the one or more speed sensors 130 is disposed between the one or more bearings 60 and the first end 101 of the flexible coupling shaft 100.

The engine 10 may further include a torque sensor 140 disposed at the second end 102 of the flexible coupling shaft 100. The torque sensor 140 is disposed in the radial direction R toward the flexible coupling shaft 100. The combination of the flexible coupling shaft 100 coupled at the first end 101 at the rotor 32, coupled at the second end 102 at the gearbox 45, and disposing the speed sensor 130 therebetween may remove overspeed detection of the engine core 20 from the critical torque path from the engine core 20 to the gearbox 45. For example, mounting the flexible coupling shaft 100 from the rotor 32 and extending the hub 34 toward the forward end 99 of the engine 10 may enable overspeed detection at the speed sensor 130 while minimizing affects to torque readings at the torque sensor 140 at the second end 102 proximate to the gearbox 45. Additionally, by extending the flexible coupling shaft 100 radially within and generally co-axial to the hub 34 of the rotor 32, the aforementioned combination may reduce engine 10 packaging by enabling more proximate disposition of the gearbox 45 to the one or more bearings 60 on the rotor 32.

In various embodiments, such as shown in FIGS. 3 and 4, the flexible shaft 100 may define one or more platforms 105 extended at least partially in the radial direction R and adjacent to an inner diameter of the hub 34 of the rotor 32 defining the disk 33. The one or more platforms 105 may further extend at least partially in the axial direction A. The one or more platforms 105 may define an interference fit between the platform 105 and the hub 34 such as to at least partially retain the flexible shaft 100 relative to the rotor 32.

The flexible coupling shaft 100 and other parts, components, or assemblies of the engine 10 shown and described in regard to FIGS. 1-4 may be formed of metals appropriate for turbine engines including, but not limited to, iron-based, titanium-based, nickel-based, or cobalt-based alloys, each of which may include chromium, cobalt, tungsten, tantalum, molybdenum, and/or rhenium. The flexible coupling shaft 100 may be formed using casting, forging, machining, or combinations thereof. Additionally, or alternatively, the flexible coupling shaft 100 may be formed as a single unitary structure or an assembly of several components joined by one or more mechanical fasteners or joining processes, or combinations thereof.

During operation of the engine 10, as shown and described in regard to FIGS. 1-4 collectively, a volume of air as indicated schematically by arrows 90 enters the engine 10. As the air 90 passes across the fan or propeller blades 42, a portion of the air as indicated schematically by arrows 91 is directed or routed outside of the engine core 20 to provide propulsion. Additionally, another portion of air as indicated schematically by arrows 92 is directed or routed through an associated inlet 80 into the compressor section 21. The air 92 is progressively compressed as it flows through the compressor section 21, such as through the LPC 22 and the HPC 24, toward the combustion section 26.

The now compressed air as indicated schematically by arrows 93 flows into the combustion section 26 where a fuel is introduced, mixed with at least a portion of the compressed air 93, and ignited to form combustion gases 94. The combustion gases 94 flow into the turbine section 31, causing rotary members of the turbine section 31 to rotate and support operation of respectively coupled rotary members in the compressor section 21 and/or fan or propeller assembly 14. For example, the HPC 24 and the HPT 28 may be coupled and rotatable to drive the engine 10 and generate combustion gases 94 at the combustion section 26 to drive the LPT 30. The LPT 30 may be connected to the LPC 22. Referring to FIG. 1, the flexible coupling shaft 100 may be attached to the LPC 22 at the first end 101 and to the gearbox 45 at the second end 102. In other embodiments the flexible coupling 100 shaft may be attached to the HPC 24 at the first end 101. Referring to FIG. 2, the flexible coupling shaft 100 may be attached to the LPT 30 at the first end 101 and to the gearbox 45 at the second end 102. In other embodiments the flexible coupling shaft 100 may be attached to the HPT 28 at the first end 101. The gearbox 45 reduces the rotational speed from the engine core 20 (e.g. the compressor section 21 or the turbine section 31) and provides a desired amount of torque and rotational speed to the fan or propeller assembly 14.

Figure 5:
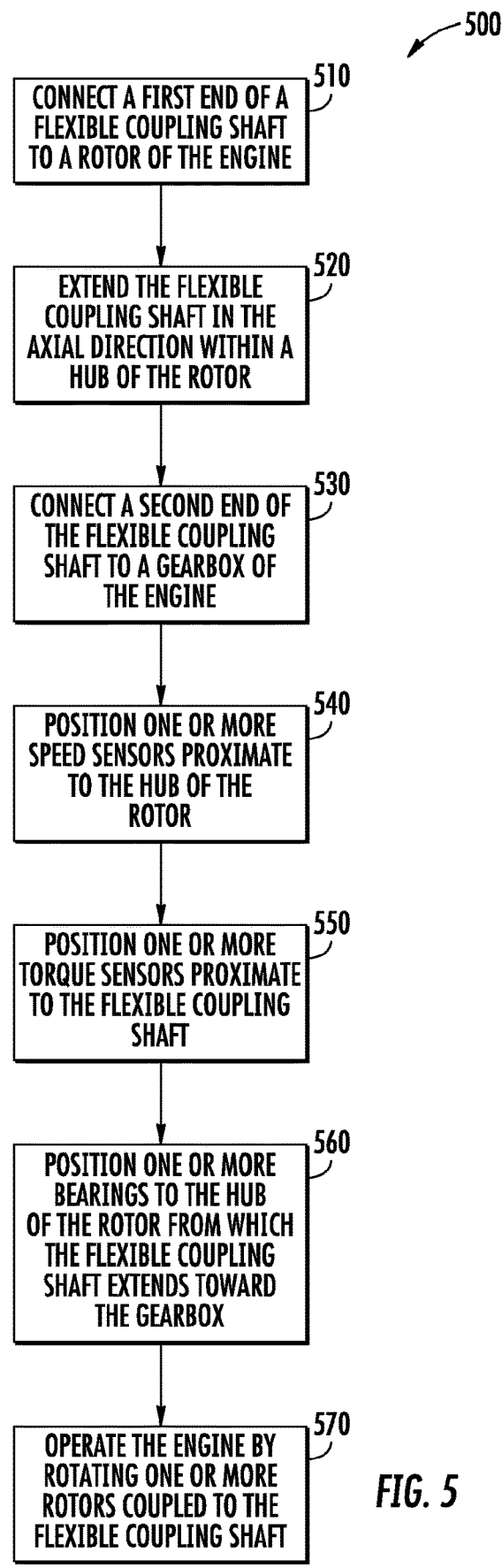
FIG. 5 is a flowchart outlining exemplary steps of a method of connecting a gearbox to an engine core.

Referring now to FIG. 5, a flowchart outlining steps of an exemplary method of connecting a turbine engine gearbox and engine core (herein referred to as "method 500") is generally provided. The method 500 may remove overspeed detection from the critical torque path between an engine core and a power or reduction gearbox. FIG. 5 depicts steps performed in a particular order for the purposes of illustration and discussion. Those of ordinary skill in the art, using the disclosures provided herein, will understand that various steps of any of the methods disclosed herein can be adapted, modified, rearranged, omitted, or expanded in various ways without deviating from the scope of the present disclosure.

The method 500 may include a turbine engine such as the engine 10 shown in FIGS. 1-4 and described herein. The method 500 may include at (510) connecting a first end of a flexible coupling shaft to a rotor of the engine, at (520) extending the flexible coupling shaft in the axial direction within a hub of the rotor, and at (530) connecting a second end of the flexible coupling shaft to a gearbox of the engine.

At (510), the method 500 may include connecting a radially extended portion of the first end of the flexible coupling shaft in adjacent axial arrangement to a radially extended portion of the rotor. In one embodiment, such as shown and described in regard to FIGS. 1-4, the radially extended coupling 120 may be connected in adjacent axial arrangement to the radially extended disk 33 of the rotor 32.

The method 500 may further include at (540) positioning one or more speed sensors proximate to the hub of the rotor. In one embodiment, such as shown in FIGS. 3 and 4, the speed sensor 130 may be positioned between the first end 101 and the second end 102 of the flexible coupling shaft 100.

The method 500 may further include at (550) positioning one or more torque sensors proximate to the flexible coupling shaft. In one embodiment, such as shown in FIGS. 3 and 4, the torque sensor 140 may be positioned proximate to the second end 102 of the flexible coupling shaft 100.

In various embodiments, the method 500 may further include at (560) positioning one or more bearings to the hub of the rotor from which the flexible coupling shaft extends toward the gearbox. In one embodiment, such as shown in FIGS. 3 and 4, the one or more bearings 60 is coupled to the hub 34 of the rotor 32 from which the flexible coupling shaft 100 extends toward the gearbox 45.

The method (500) may further include at (570) operating the engine by rotating one or more rotors coupled to the flexible coupling shaft. In one embodiment, such as shown in FIGS. 1-4, the flexible coupling shaft 100 is coupled to one or more rotors 32 of the engine core 20 such that rotation or operation of the engine core 20 transmits torque and power to and through the flexible coupling shaft 100 to the gearbox 45 and the fan or propeller assembly 14.

The systems and methods shown in FIGS. 1-5 and described herein may remove overspeed detection from the critical torque path from the engine core 20 to the fan or propeller assembly 14. Additionally, the systems and methods described herein may reduce packaging of a turbine engine by reducing axial length of the engine 10 and positioning the gearbox 45 of the fan or propeller assembly 14 more closely to the engine core 20. Furthermore, the systems and methods described herein may improve engine 10 responses to intermittent changes in power output or torque from the engine core 20 to the fan or propeller assembly 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A turbine engine defining an axial longitudinal direction and a radial direction, the turbine engine comprising:
  a fan or propeller assembly comprising a gearbox;
  an engine core comprising one or more rotors, wherein at least one of the rotors defines an axially extended annular hub; and
  a flexible coupling shaft defining a first end and a second end along the axial longitudinal direction, wherein the first end is connected to the engine core and the second end is connected to the gearbox, and further wherein the flexible coupling shaft extends from the one or more rotors to the gearbox in the axial longitudinal direction and inward of the axially extended annular hub in the radial direction, and wherein the flexible coupling shaft extends essentially coaxially to the axially extended annular hub.

2. The turbine engine of claim 1, wherein the flexible coupling shaft is connected to at least one rotor of the engine core.

3. The turbine engine of claim 1, wherein the flexible coupling shaft defines a plurality of splines, and wherein the gearbox defines a spline interface, and further wherein the plurality of splines is coupled to the spline interface.

4. The turbine engine of claim 1, wherein the flexible coupling shaft further defines a coupling extended at least partially in the radial direction and coupled to the one or more rotors of the engine core.

5. The turbine engine of claim 4, wherein the coupling defines one or more fastening locations at which the one or more rotors of the engine core and the coupling attach in axially adjacent arrangement.

6. The turbine engine of claim 4, wherein the coupling of the flexible coupling shaft is attached to the one or more rotors of the engine core in axially adjacent arrangement, and wherein the one or more rotors defines a rotor in a compressor section.

7. The turbine engine of claim 4, wherein the coupling of the flexible coupling shaft is attached to the one or more rotors of the engine core in axially adjacent arrangement, and wherein the one or more rotors defines a rotor in a turbine section.

8. The turbine engine of claim 1, further comprising: one or more speed sensors disposed in the radial direction toward the axially extended annular hub of the one or more rotors, and wherein the one or more speed sensors is disposed between the first end and the second end of the flexible coupling shaft.

9. The turbine engine of claim 3, wherein the plurality of splines of the flexible coupling shaft defines a star gear, and wherein the star gear is coupled to the spline interface at the gearbox.

10. The turbine engine of claim 1, wherein the flexible coupling shaft defines a second plurality of splines at the first end, and wherein the second plurality of splines couples with a second spline interface at the engine core.

11. The turbine engine of claim 1, further comprising:
  one or more torque sensors disposed at the second end of the flexible coupling shaft, wherein the one or more torque sensors is disposed in the radial direction toward the flexible coupling shaft.

12. The turbine engine of claim 1, further comprising: one or more bearings coupled to the axially extended annular hub of the one or more rotors from which the flexible coupling shaft extends toward the gearbox.

13. The turbine engine of claim 12, wherein the one or more bearings is disposed between the first end and the second end of the flexible coupling shaft.

14. The turbine engine of claim 12, further comprising:
  one or more speed sensors disposed in the radial direction toward the axially extended annular hub of the one or more rotors, and wherein the one or more speed sensors is disposed between the first end and the second end of the flexible coupling shaft, and further wherein the one or more speed sensors is disposed between the one or more bearings and the first end of the flexible coupling shaft.

15. A method of arranging a turbine engine, wherein the turbine engine includes a fan or a propeller assembly and an engine core, and wherein the fan or the propeller assembly includes a gearbox defining a spline interface, and further wherein the engine core includes one or more rotors, the one or more of the rotors defining a hub extended in an axial longitudinal direction, the method comprising:
    connecting a first end of a flexible coupling shaft to the one or more rotors;
    extending the flexible coupling shaft in the axial longitudinal direction and radially within the hub so that the flexible coupling shaft extends from the one or more rotors to the gearbox in the axial longitudinal direction and inward of the hub in a radial direction, and so that the flexible coupling shaft extends essentially coaxially to the axially extended hub; and
    connecting a second end of the flexible coupling shaft to the gearbox of the fan or propeller assembly.

16. The method of claim 15, wherein connecting the first end of the flexible coupling shaft to the one or more rotors includes connecting a radially extended portion of the first end of the flexible coupling shaft in adjacent axial arrangement to the radially extended portion of the one or more rotors.

17. The method of claim 15, further comprising:
    positioning one or more speed sensors proximate to the hub of the one or more rotors.

18. The method of claim 17, wherein positioning one or more speed sensors proximate to the hub of the one or more rotors includes positioning one or more speed sensors between the first end and the second end of the flexible coupling shaft.

19. The method of claim 15, further comprising:
    positioning one or more torque sensors proximate to the second end of the flexible coupling shaft.

20. The method of claim 15, further comprising:
    positioning one or more bearings to the hub of the one or more rotors from which the flexible coupling shaft extends toward the gearbox.

* * * * *